(12) United States Patent
Kim et al.

(10) Patent No.: US 11,021,844 B2
(45) Date of Patent: Jun. 1, 2021

(54) SAFETY TRIPOD

(71) Applicant: Hyundai Mobis Co., Ltd., Seoul (KR)

(72) Inventors: Seon Yeob Kim, Yongin-si (KR); Sang Oh Han, Yongin-si (KR); Kyong Won Min, Yongin-si (KR); Sun Bin Yim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 70 days.

(21) Appl. No.: 16/216,213

(22) Filed: Dec. 11, 2018

(65) Prior Publication Data

US 2019/0177935 A1 Jun. 13, 2019

(30) Foreign Application Priority Data

Dec. 11, 2017 (KR) .......................... 10-2017-0168952

(51) Int. Cl.
| | |
|---|---|
| *E01F 9/70* | (2016.01) |
| *E01F 9/615* | (2016.01) |
| *E01F 9/662* | (2016.01) |
| *E01F 9/619* | (2016.01) |
| *E01F 9/692* | (2016.01) |
| *B64C 27/08* | (2006.01) |
| *B64C 39/02* | (2006.01) |
| *B64C 25/66* | (2006.01) |
| *B60Q 7/00* | (2006.01) |
| *B64C 25/32* | (2006.01) |

(52) U.S. Cl.
CPC .................. *E01F 9/70* (2016.02); *B60Q 7/00* (2013.01); *B64C 25/66* (2013.01); *B64C 27/08* (2013.01); *B64C 39/024* (2013.01); *E01F 9/615* (2016.02); *E01F 9/619* (2016.02); *E01F 9/662* (2016.02); *E01F 9/692* (2016.02); *B64C 2025/325* (2013.01); *B64C 2201/024* (2013.01); *B64C 2201/042* (2013.01); *B64C 2201/108* (2013.01); *B64C 2201/12* (2013.01); *B64C 2201/127* (2013.01); *B64C 2201/165* (2013.01); *B64C 2201/18* (2013.01); *B64C 2201/208* (2013.01)

(58) Field of Classification Search
CPC ... E01F 9/70; E01F 9/615; E01F 9/619; E01F 9/662; E01F 9/692; B60Q 7/00; B64C 25/66; B64C 27/08

See application file for complete search history.

(56) References Cited

U.S. PATENT DOCUMENTS

| | | | |
|---|---|---|---|
| 9,242,600 B2 * | 1/2016 | Al Shalabi ............... | B60Q 7/00 |
| 9,542,841 B2 * | 1/2017 | De Oliveira ..... | G08G 1/096758 |
| 9,878,661 B2 * | 1/2018 | Yang .................... | B60Q 7/00 |
| 9,927,811 B1 * | 3/2018 | Tseng ................... | G05D 1/0088 |
| 10,301,785 B2 * | 5/2019 | Huang ................... | B60Q 7/005 |
| 10,529,147 B2 * | 1/2020 | Gordon ................ | G07C 5/0808 |
| 10,563,366 B2 * | 2/2020 | Tseng ...................... | G09F 21/04 |
| 10,703,459 B2 * | 7/2020 | Yang ....................... | B64C 1/16 |
| 2006/0181432 A1 * | 8/2006 | Monteith ................ | B60Q 7/00 |
| | | | 340/907 |

(Continued)

*Primary Examiner* — Abigail A Risic

(74) *Attorney, Agent, or Firm* — H.C. Park & Associates, PLC

(57) ABSTRACT

The safety tripod includes a tripod, a flight driving machine mounted on the tripod to enable the tripod to fly, a landing base for seating the tripod on the ground when the tripod lands, and a standing guide mounted on the tripod to enable the tripod to stand up.

6 Claims, 12 Drawing Sheets

(56) References Cited

U.S. PATENT DOCUMENTS

| | | | |
|---|---|---|---|
| 2015/0073623 A1* | 3/2015 | Zhang | G05D 1/0011 |
| | | | 701/2 |
| 2016/0107751 A1* | 4/2016 | D'Andrea | G05D 1/0072 |
| | | | 701/4 |
| 2016/0272317 A1* | 9/2016 | Cho | G08G 1/162 |
| 2016/0379492 A1* | 12/2016 | Roy | G01S 13/00 |
| | | | 340/907 |
| 2018/0029522 A1* | 2/2018 | Gordon | B60Q 5/00 |
| 2018/0061235 A1* | 3/2018 | Goldberg | G05D 1/1064 |
| 2018/0134214 A1* | 5/2018 | Yoon | B60N 3/04 |
| 2018/0190042 A1* | 7/2018 | Gordon | B64D 1/02 |
| 2018/0281670 A1* | 10/2018 | Chen | B60Q 7/00 |
| 2018/0326983 A1* | 11/2018 | Lee | B25J 5/007 |
| 2018/0354417 A1* | 12/2018 | Parissi | B64C 39/024 |
| 2018/0362041 A1* | 12/2018 | Tai | G05D 1/0282 |
| 2018/0363255 A1* | 12/2018 | Tseng | B60Q 7/005 |
| 2019/0024332 A1* | 1/2019 | Huang | G08G 1/0955 |
| 2019/0302803 A1* | 10/2019 | Misfeldt | B64C 19/00 |
| 2019/0322367 A1* | 10/2019 | El Idrissi | G08G 5/0069 |
| 2019/0360164 A1* | 11/2019 | Lee | E01F 9/692 |
| 2020/0164966 A1* | 5/2020 | Suzuki | B64C 39/02 |
| 2020/0164981 A1* | 5/2020 | Chundi | B64D 1/00 |
| 2020/0216181 A1* | 7/2020 | Yagihashi | B64D 17/80 |

* cited by examiner

SAFETY TRIPOD

CROSS-REFERENCES TO RELATED APPLICATION

The present application claims priority from and the benefit of Korean Patent Application No. 10-2017-0168952, filed on Dec. 11, 2017, which is incorporated by reference for all purposes as if set forth herein.

BACKGROUND

Field

Exemplary embodiments relate to a safety tripod, and more particularly, to a safety tripod that can be easily stored in a vehicle and can be easily installed at an accident site.

Discussion of the Background

When an accident occurs on a highway or the like, safety tripods are set up to prevent the second accident. However, since these safety tripods have to be installed by the user, another accident may occur.

Conventionally, the safety tripod is attached to a drone in order to warn the rear of the accident point. In such a structure, the safety tripod is mounted on the drone, which is bulky to store in the vehicle. Even if the safety tripod is removed from the drone and stored in the vehicle, it is troublesome to attach the safety tripod to the drone and move backward from the accident point. In addition, as an accident notification method, the drones fly or hover in order to indicate the location of the accident with a laser. However, in this case, the flight time of the drone may not be long, and the battery may be discharged due to the battery limit of the drone.

That is, there are problems that the conventional safety tripods have a risk of causing another accident because the user has to install them at the accident site directly, the safety tripods using the drone are not easy to store, and the batteries are discharged during flight for notification due to the limitation of the drone battery. Therefore, there is a need for improvement.

The related art of the present invention was introduced in Korean Patent Registration Publication No. 10-1689772 (registered on Dec. 20, 2016, entitled "THE WARNING ON REAR APPROACHING AND THE METHOD OF ACCIDENT WARNING USING THAT").

The above information disclosed in this Background section is only for enhancement of understanding of the background of the invention and, therefore, it may contain information that does not constitute prior art.

SUMMARY

Exemplary embodiments of the present invention has been made in order to solve the above-mentioned problem, and embodiments of the present invention are directed to a safety tripod that can be easily stored in a vehicle and can be easily installed at an accident site.

The safety tripod according to an aspect of the present invention may include: a tripod; a flight driving machine mounted on the tripod to enable the tripod to fly; a landing base for seating the tripod on the ground when the tripod lands; and a standing guide mounted on the tripod to enable the tripod to stand up.

The tripod may include a frame formed in a triangular shape; and an accident indicator mounted on the frame and having a light source for visually notifying an accident.

The light source may include a light emitting diode (LED) lamp.

The flight driving machine may include drive motors mounted at each corner of the tripod; propellers connected to the drive motors, rotated by a power generated by the drive motors, and capable of flying the tripod; and a flight controller for controlling the operation of the drive motor.

A first camera for photographing the front of the flight direction of the safety tripod, a second camera for photographing the lower part of the flight direction of the safety tripod, a flight altitude measurer for measuring the flight altitude of the safety tripod, and a position measurer for measuring the flying position of the safety tripod may be mounted on the tripod, and the flight controller may receive the information measured by the first camera, the second camera, the flight altitude measurer and the position measurer to control the operation of the drive motors.

A fisheye lens for photographing the front and the lower part of the flight direction of the safety tripod, a flight altitude measurer for measuring the flight altitude of the safety tripod, and a position measurer for measuring the flight position of the safety tripod may be mounted on the tripod, and the flight controller may receive the information measured by the camera, the flight altitude measurer, and the position measurer to control the operation of the drive motors.

The landing base may include a connector vertically mounted on the tripod; and a seat fixed to the connector and disposed parallel to the tripod.

The standing guide may include a motor fixed to the tripod and having a motor shaft rotatably mounted thereon; and a supporting bar rotated by the motor shaft and supported on the ground to stand up the tripod.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
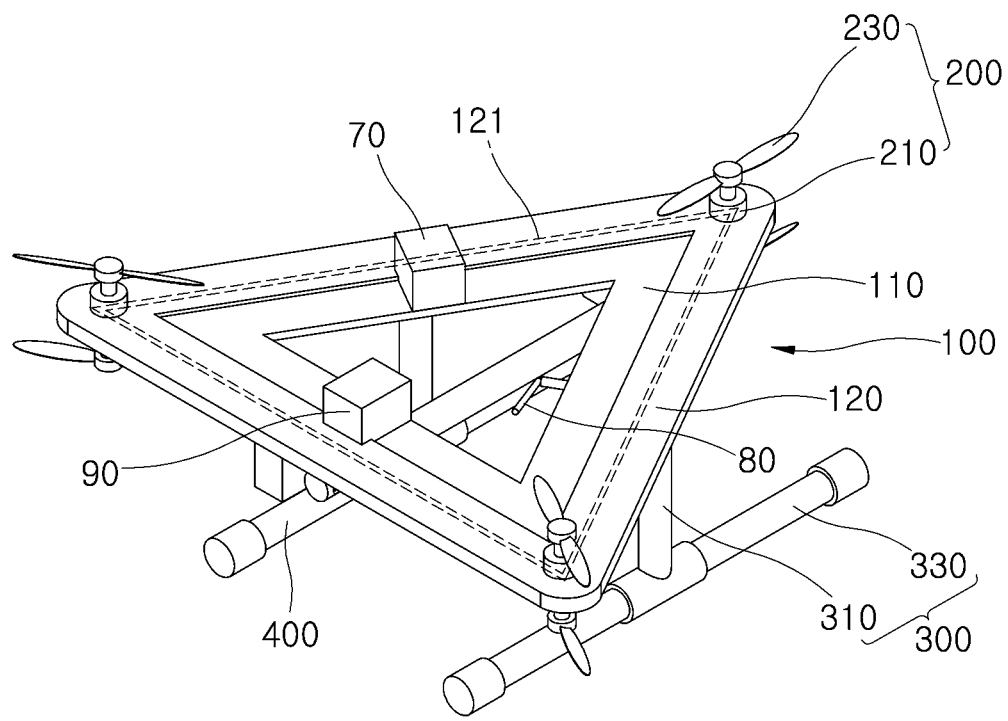
FIG. 1 is a perspective view schematically illustrating a safety tripod according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a safety tripod in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
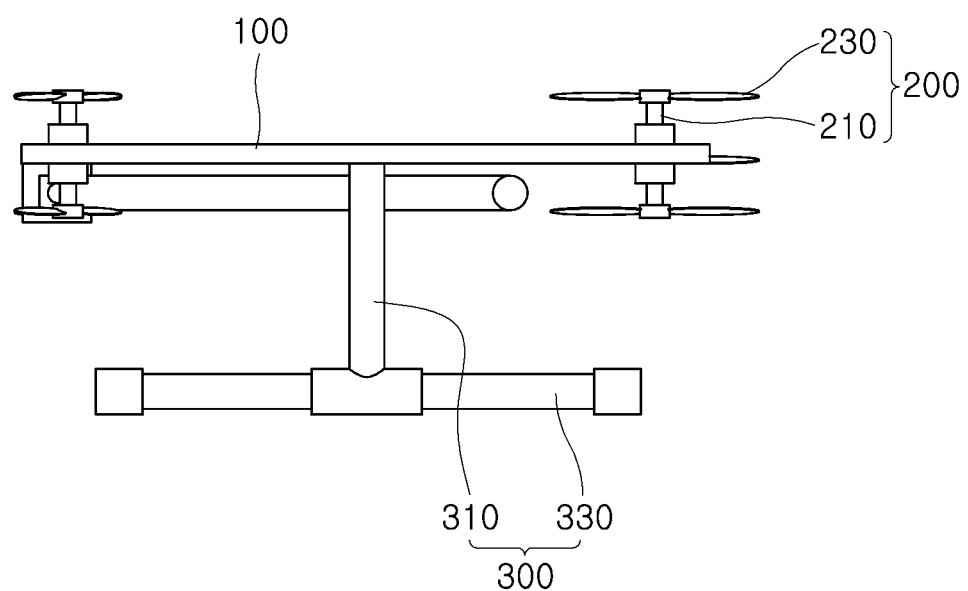
FIG. 2 is a front view schematically illustrating a safety tripod according to an embodiment of the present invention.
Figure 3:
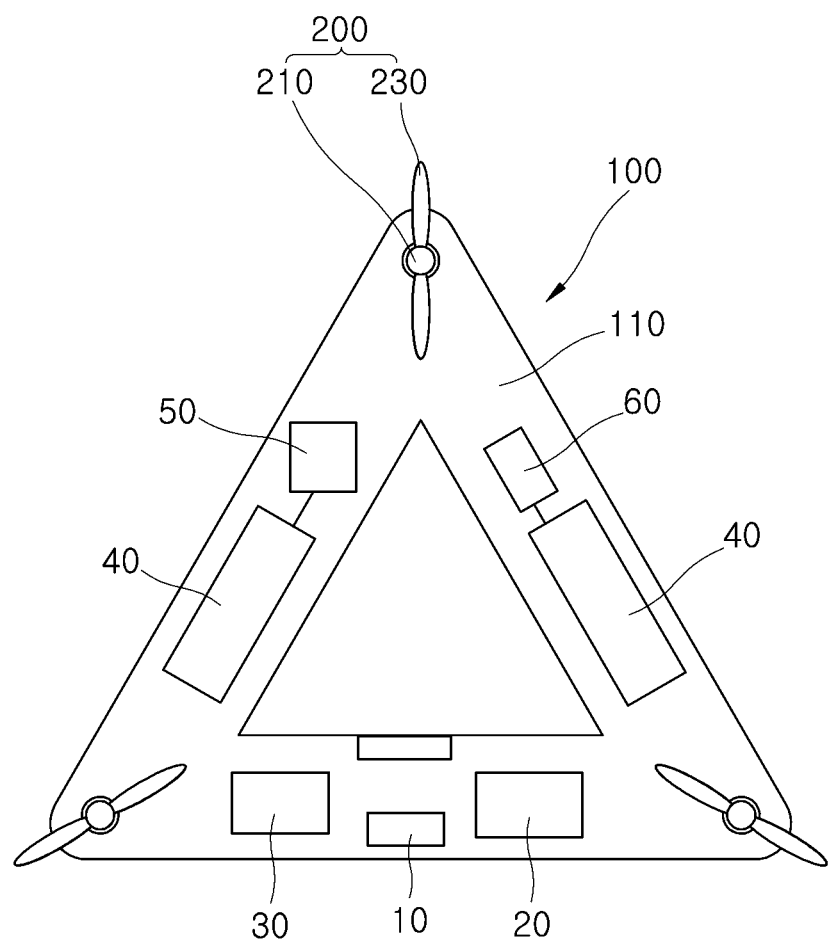
FIG. 3 is a bottom view schematically illustrating a safety tripod according to an embodiment of the present invention.
Figure 4:
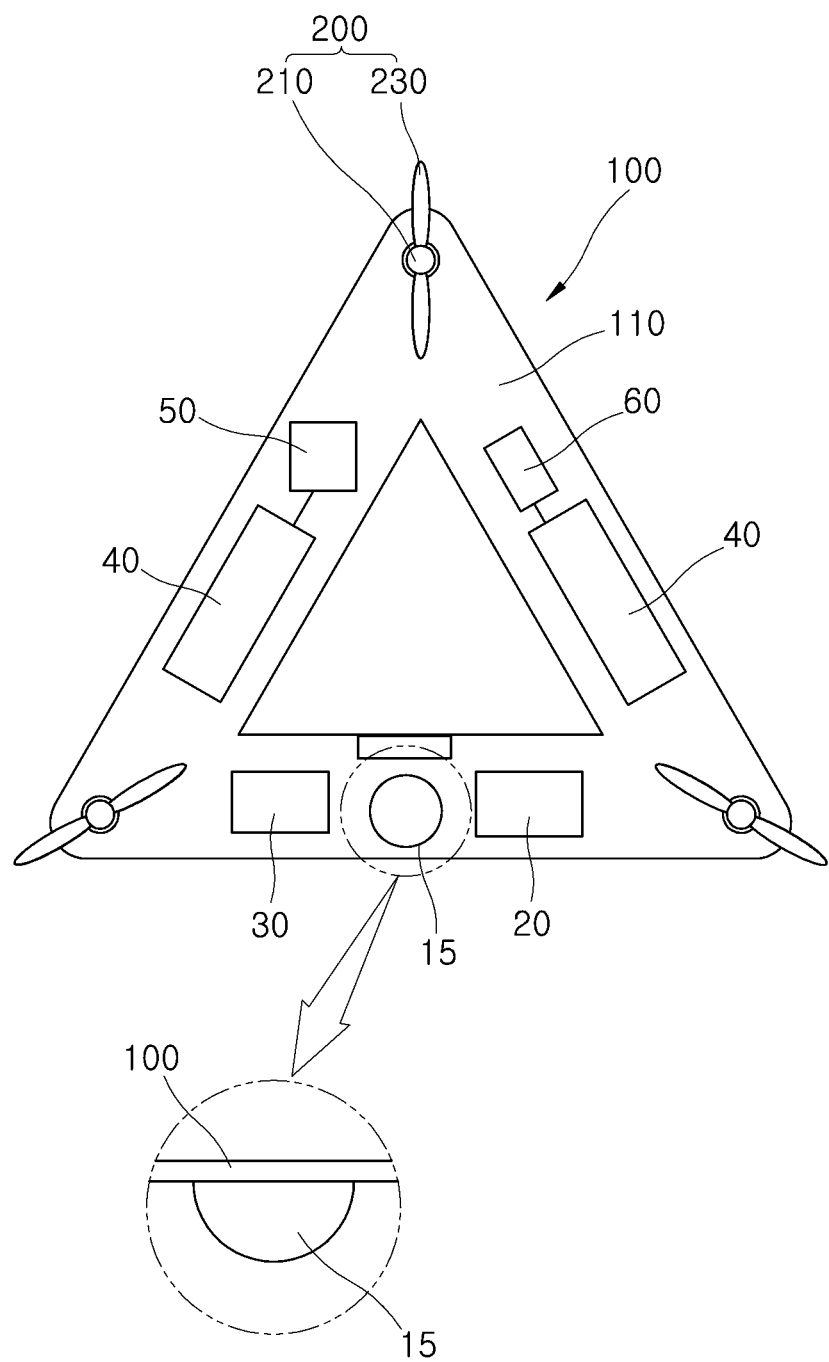
FIG. 4 is a bottom view schematically illustrating a safety tripod according to another embodiment of the present invention.
Figure 5:
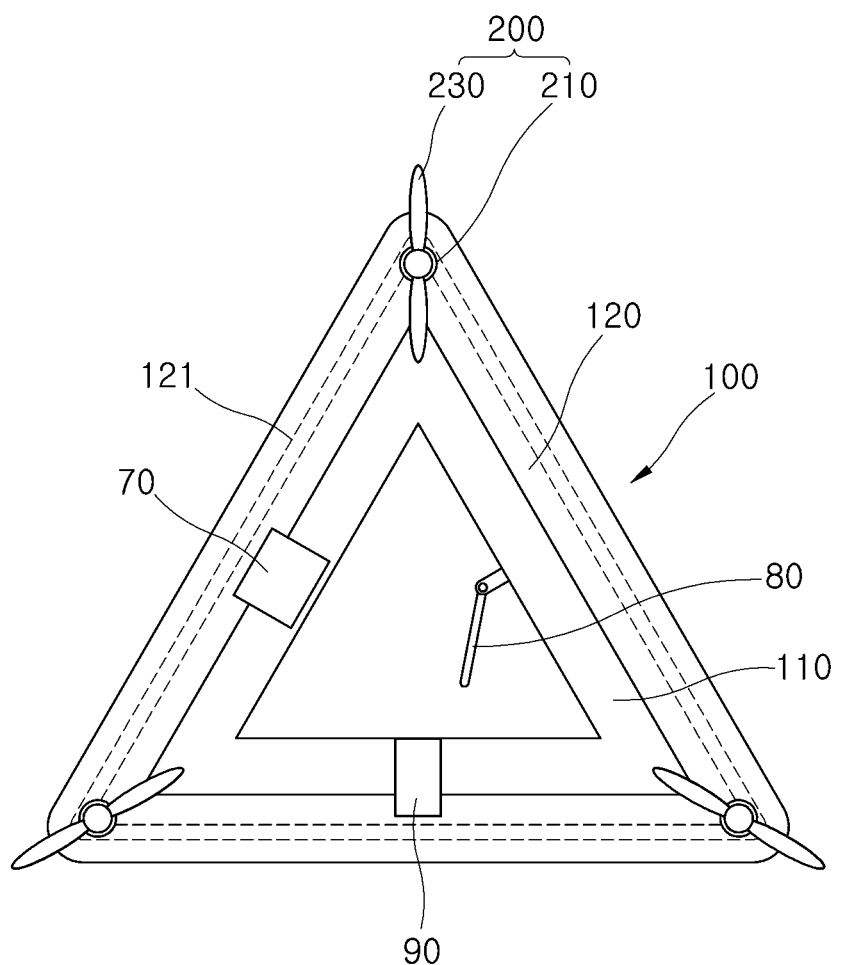
FIG. 5 is a plane view schematically illustrating a safety tripod according to an embodiment of the present invention.
Figure 6:
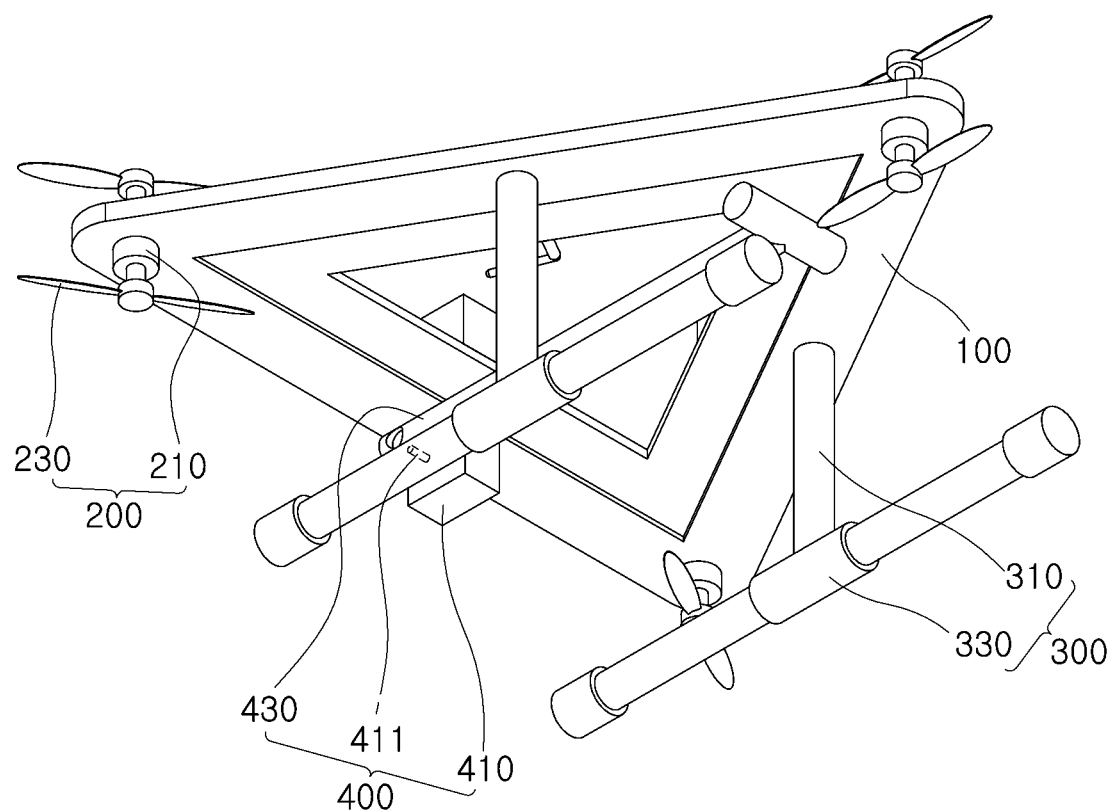
FIG. 6 is a bottom perspective view schematically illustrating a safety tripod according to an embodiment of the present invention.
Figure 7:
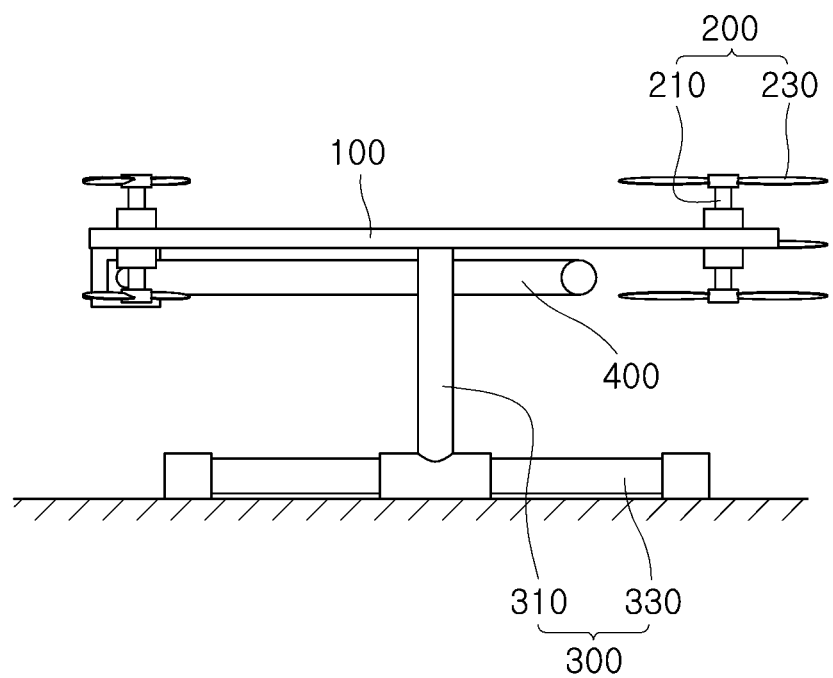
FIG. 7 is a side view schematically illustrating a state in which a landing base of a safety tripod according to an embodiment of the present invention contacts the ground.
Figure 8:
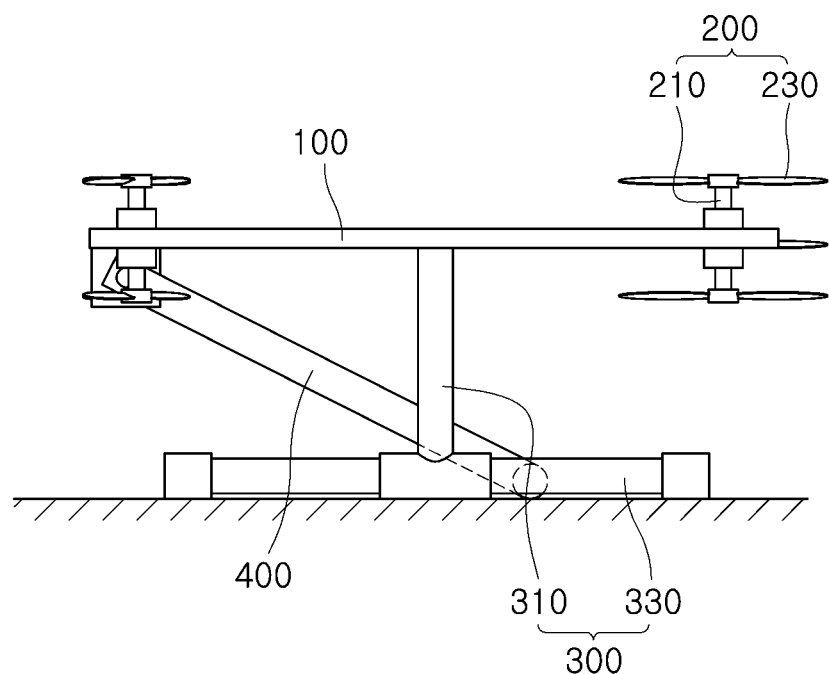
FIG. 8 is a side view schematically illustrating a state in which a standing guide of a safety tripod according to an embodiment of the present invention contacts the ground.
Figure 9:
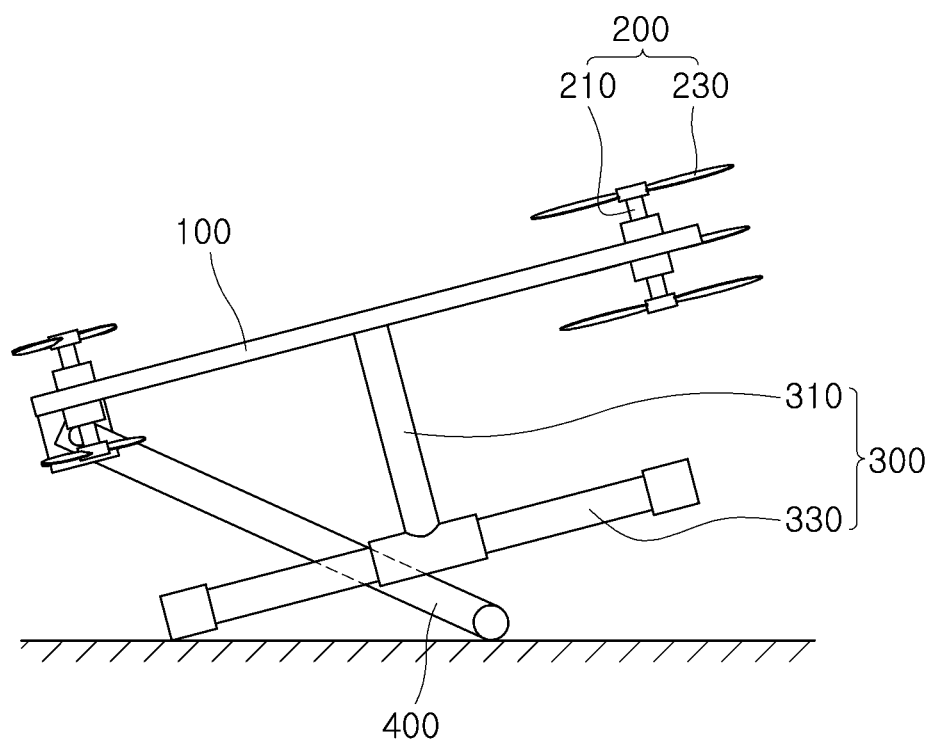
FIG. 9 is a side view schematically illustrating that a landing base of a safety tripod according to an embodiment of the present invention stands up with respect to the ground by the operation of a standing guide.
Figure 10:
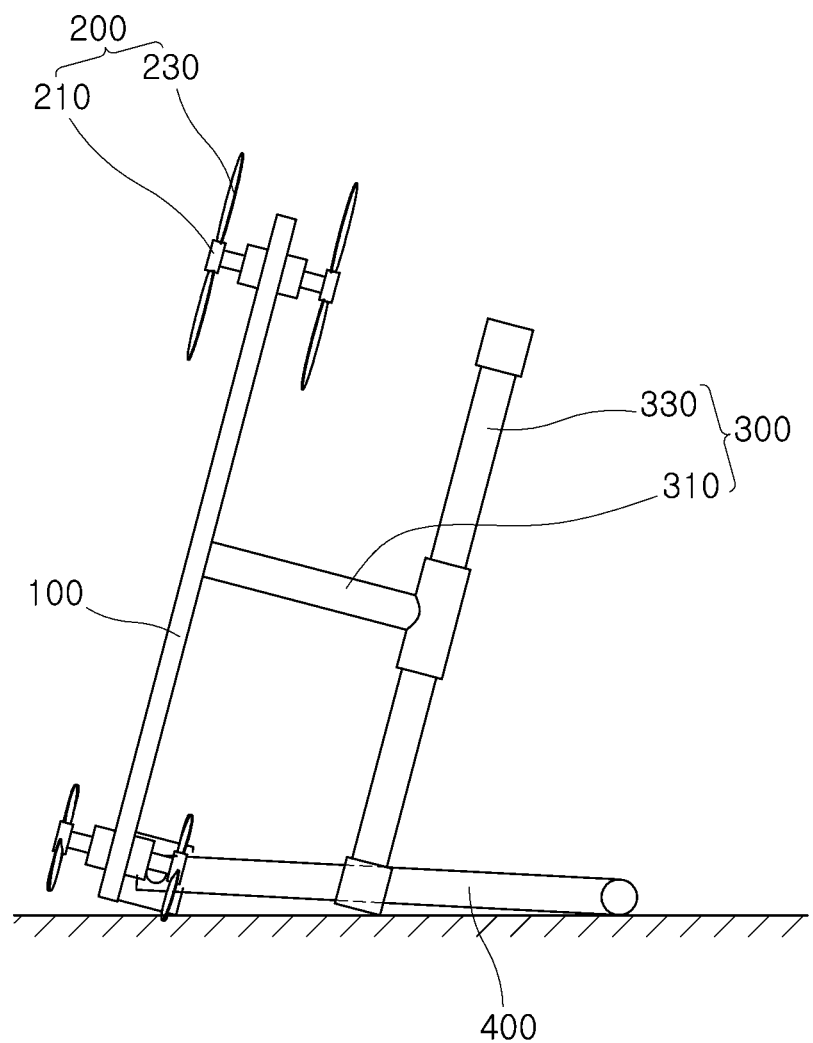
FIG. 10 is a side view schematically illustrating a state in which a tripod of a safety tripod according to an embodiment of the present invention stands up by a standing guide and a landing base.
Figure 11:
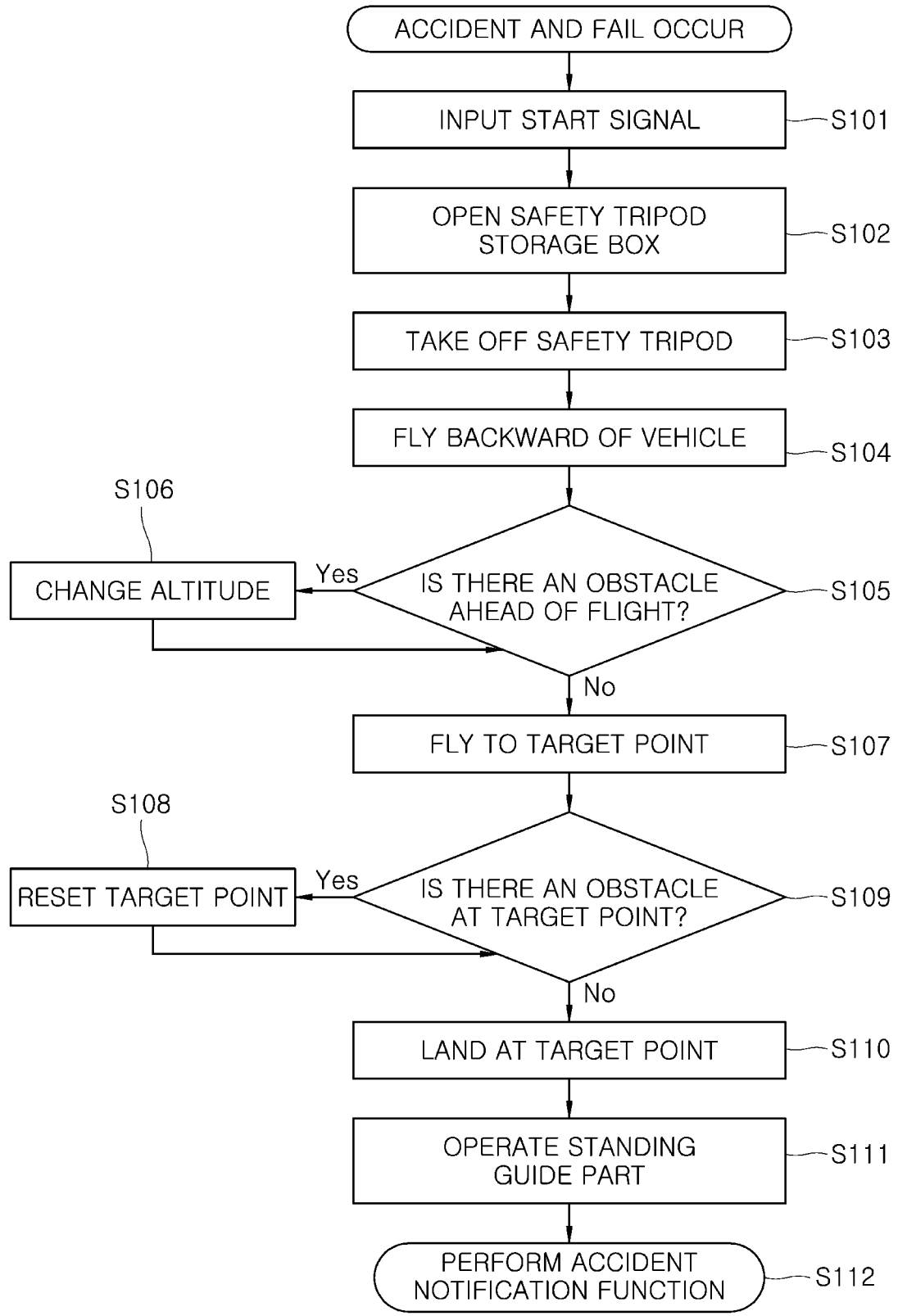
FIG. 11 is a flow chart schematically illustrating the performance of an accident notification function of a safety tripod according to an embodiment of the present invention.
Figure 12:
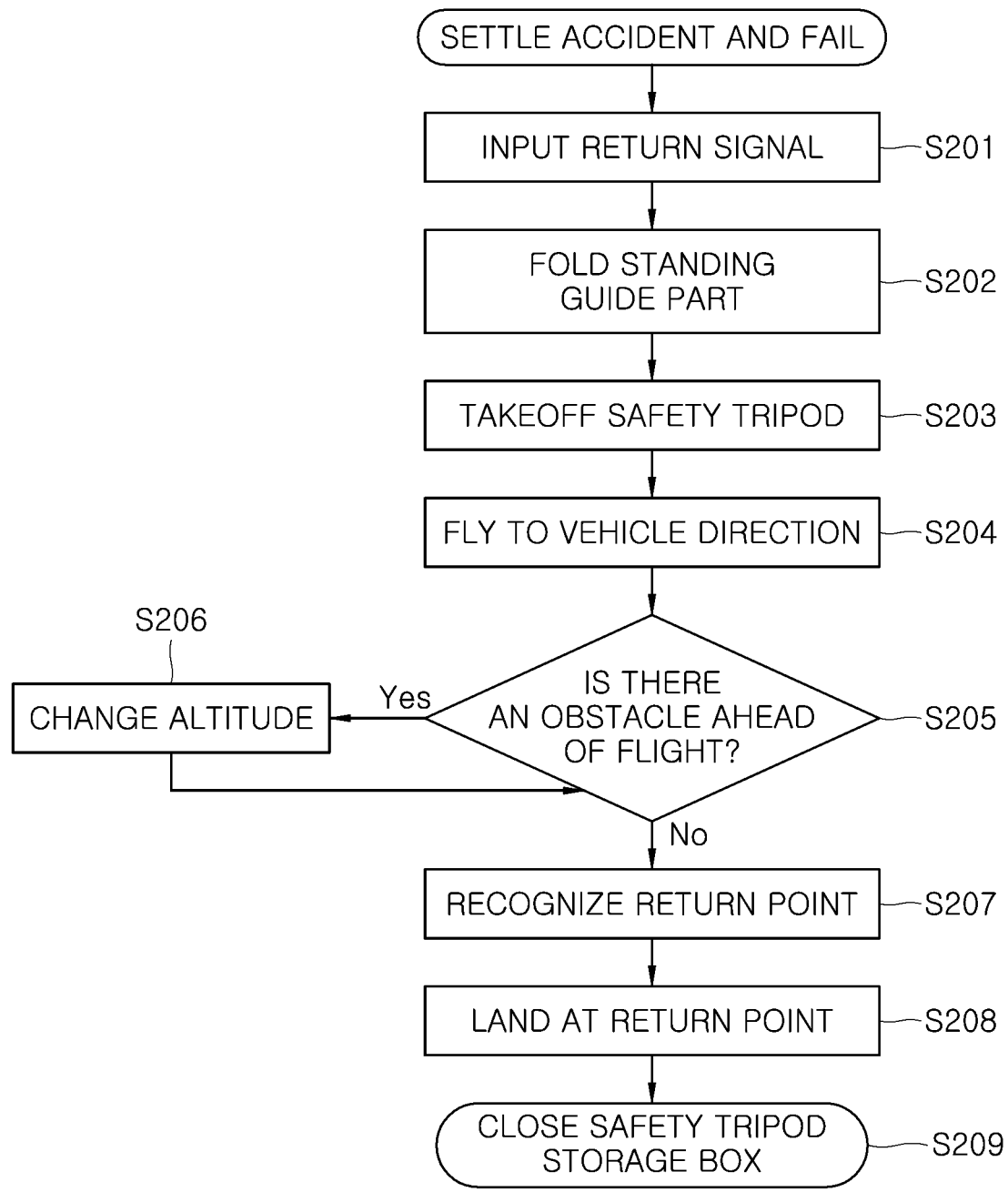
FIG. 12 is a flow chart schematically illustrating the return operation of a safety tripod according to an embodiment of the present invention.

FIG. 1 is a perspective view schematically illustrating a safety tripod according to an embodiment of the present invention, FIG. 2 is a front view schematically illustrating the safety tripod according to the embodiment of the present invention, FIG. 3 is a bottom view schematically illustrating the safety tripod according to the embodiment of the present invention, FIG. 4 is a bottom view schematically illustrating a safety tripod according to another embodiment of the present invention, FIG. 5 is a plane view schematically illustrating the safety tripod according to the embodiment of the present invention, FIG. 6 is a bottom perspective view schematically illustrating the safety tripod according to the embodiment of the present invention, FIG. 7 is a side view schematically illustrating a state in which a landing base of the safety tripod according to the embodiment of the present invention contacts the ground, FIG. 8 is a side view schematically illustrating a state in which a standing guide of the safety tripod according to the embodiment of the present invention contacts the ground, FIG. 9 is a side view schematically illustrating that the landing base of the safety tripod according to the embodiment of the present invention stands up with respect to the ground by the operation of the standing guide, FIG. 10 is a side view schematically illustrating a state in which a tripod of the safety tripod according to the embodiment of the present invention stands up by the standing guide and the landing base, FIG. 11 is a flow chart schematically illustrating the performance of an accident notification function of the safety tripod according to the embodiment of the present invention, and FIG. 12 is a flow chart schematically illustrating the return operation of the safety tripod according to the embodiment of the present invention.

Referring to FIGS. 1 and 2, the safety tripod according to the embodiment of the present invention may include a tripod 100, flight driving machines 200, landing bases 300, and a standing guide 400. The tripod 100 may include a frame 110 and an accident indicator 120 for notifying an accident to a vehicle traveling in the rear.

The frame 110 may be formed in a triangular shape. The accident indicator 120 may be mounted on one surface of the frame 110 (upper surface in FIG. 1), and visually inform the vehicle traveling in the rear of the occurrence of an accident. The accident indicator 120 may include a light source 121. The light source 121 may include a plurality of LED (Light Emitting Diode) lamps mounted on the accident indicator 120. The light source 121 may emit red light.

The flight driving machines 200 may be mounted on one surface (upper surface in FIG. 1) and the other surface (lower surface in FIG. 1) of the frame 110 of the tripod 100 and allow the tripod 100 to fly to a set distance from the accident site. Here, the set distance may be set to about one hundred meters (100 m) behind the accident site in the daytime and about two hundred meters (200 m) behind the accident site in the nighttime. The set distance may be arbitrarily set, and may be adjusted differently depending on the accident location, the surrounding environment and the like.

The flight driving machines 200 mounted on one surface of the tripod 100 may be used for the flight of the tripod 100, and the flight driving machines 200 mounted on the other surface of the tripod 100 may be used to correct the posture of the tripod 100. Each of the flight driving machines 200 may include a drive motor 210, a propeller 230, and a flight controller 20.

The drive motor 210 may be mounted on each corner of one surface (upper surface in FIG. 1) and the other surface (lower surface in FIG. 1) of the frame 110 of the tripod 100. The propeller 230 may be rotatably mounted on each drive motor 210 and may allow the tripod 100 to fly while being rotated around the drive motor 210. The flight controller 20 may control the operation of the drive motors 210. The flight controller 20 may control the operation of the drive motors 210 to adjust the rotation angle, the rotation speed, and the like of the propellers 230.

Referring to FIGS. 6 and 7, the landing bases 300 may seat the tripod 100 landed on the ground at the accident point and serve as legs of the tripod 100. Each of the landing bases 300 may include a connector 310 and a seat 330.

The connector 310 may be vertically mounted on one side (right side in FIG. 6) of the tripod 100. The seat 330 may be fixed to the lower end of the connector 310 and disposed parallel to the tripod 100. The seat 330 may contact the ground surface, so that the tripod 100 can be stably placed.

The standing guide 400 may be mounted on the tripod 100 and may allow the tripod 100 to stand up. The standing guide 400 may adjust the angle of the tripod 100 so that the tripod 100 can be easily recognized by the vehicle traveling in the rear.

The standing guide 400 may include a motor 410 and a supporting bar 430. The motor 410 may be fixed to the frame 110 of the tripod 100 and a motor shaft 411 may be rotatably mounted on one side thereof (left side in FIG. 6).

The supporting bar 430 may be mounted at one side of the motor shaft 411, rotated by the rotation of the motor shaft 411, and supported on the ground to stand the tripod 100. The angle of the tripod 100 supported by the supporting bar 430 to the ground may be adjusted so that the tripod 100 can be easily recognized from the vehicle traveling in the rear.

Referring to FIGS. 1 to 5, a first camera 10, a controller 30, batteries 40, a second camera 50, a flight altitude measurer 60, a position measurer 70, an antenna unit 80, and an inertia measuring unit 90 may be mounted on a tripod body 110 of the tripod 100 according to the embodiment of the present invention.

Referring to FIGS. 1 and 3, the first camera 10, the controller 30, the batteries 40, the second camera 50, and the flight altitude measurer 60 may be mounted on the bottom surface of the tripod body 110. The first camera 10 may photograph the front of the tripod body 110 in the flight direction. The state of the vehicle, the lane, etc. ahead of the vehicle in the flight direction may be grasped by the first camera 10.

The batteries 40 may provide electric power to the first camera 10, the controller 30, the flight controller 20, the second camera 50, the flight altitude measurer 60, the position measurer 70, the antenna unit 80, and the inertia measuring unit 90. The batteries 40 may be arranged symmetrically in a pair on the tripod body 110.

The second camera 50, which is for photographing the lower part in the flight direction of the tripod body 110, may photograph the state of a position where the tripod body 110 is to be landed. The flight altitude measurer 60 may measure the flight altitude.

Referring to FIG. 4, a camera 15, a flight controller 20, a controller 30, batteries 40, a flight altitude measurer 60, a position measurer 70, an antenna unit 80, and an inertia measuring unit 90 may be mounted on the tripod body 110 of the tripod 100 according to another embodiment of the present invention.

The camera 15 may be mounted on the tripod body 110 of the tripod 100 and have a fish-eye lens for photographing the forward and the downward in the flight direction. The fish-eye lens may be composed of an ultra-wide angle lens whose camera angle is more than 180 degrees. In the present invention, the camera 15 can perform the function of the first camera 10 for photographing the forward in the flight direction of the tripod body 110 and the function of the second camera 50 for photographing the downward in the flight direction of the tripod body 110.

The description for the controller 30, the batteries 40, the flight altitude measurer 60, the position measurer 70, the antenna unit 80, and the inertia measuring unit 90 is replaced with the above description.

Referring to FIG. 1, the position measurer 70, the antenna unit 80, and the inertia measuring unit 90 may be mounted on the upper surface of the tripod body 110. The position measurer 70 may measure the flight position of the tripod 100. The antenna unit 80 may receive information through a satellite or the like. The inertia measuring unit 90 may measure the inertia of the tripod 100.

The flight controller 20 of the flight driving machine 200 may receive the information measured by the first camera 10 for photographing the forward in the flight direction, the second camera 50 for photographing the downward in the flight direction, the flight altitude measurer 60 for measuring the flight altitude, and the position measurer 70 for measuring the flight position or the like to control the operation of the drive motor 210 such as a rotation angle or a rotation speed, so that the tripod 100 may be allowed to fly.

Alternately, the flight driving machine 200 may receive the information measured by the camera 15, the flight altitude measurer 60 for measuring the flight altitude, the position measurer 70 for measuring the flight position or the like to control the operation of the drive motor 210 such as a rotation angle or a rotation speed, so that the tripod 100 may be allowed to fly.

Hereinafter, the safety tripod according to an embodiment of the present invention is disposed on the ground will be described with reference to FIGS. 7 to 10.

Referring to FIG. 7, the seats 330 of the landing base 300 is seated on the ground of a target point by the operation of the flight driving machine 200.

Referring to FIG. 8, the standing guide 400 is operated to contact the ground. That is, the supporting bar 430 is rotated by the operation of the motor 410, and one side (right side in FIG. 8) of the supporting bar 430 becomes to contact the ground.

Referring to FIG. 9, when one side (right side in FIG. 8) of the supporting bar 430 contacts the ground and is supported, the seat 330 rotates in one direction (counterclockwise direction in FIG. 9) about the side (left side in FIG. 9) contacting the ground.

Referring to FIG. 10, the motor 410 of the standing guide 400 sets the angle formed by the tripod 100 with the ground so that the tripod 100 can be easily recognized from the vehicle traveling behind the accident point. That is, the tripod 100 forms a set angel with the ground by the support of the pair of seats 330 and the supporting bar 430 contacting the ground.

The operation of the safety tripod according to an embodiment of the present invention will be described with reference to FIGS. 11 and 12. FIG. 11 is a flow chart schematically illustrating the performance of an accident notification function of a safety tripod according to an embodiment of the present invention, and FIG. 12 is a flow chart schematically illustrating the return operation of the safety tripod according to the embodiment of the present invention.

Referring to FIG. 11, the accident notification operation of the safety tripod according to an embodiment of the present invention may be as follows. If the vehicle collides, collides from behind, or fails, a start signal is inputted to the safety tripod stored in the trunk of a vehicle (S101). The safety tripod storage box of the vehicle is opened (S102), and the safety tripod is taken off (S103). The safety tripod is caused to fly by the operation of the flight driving machine 200 to the rear of the vehicle (S104).

The first camera 10 or the camera 15 checks whether there is an obstacle ahead of the flight direction (S105). If there is an obstacle, the flight driving machines 200 are operated by the operation of the flight altitude measurer 60 and the control unit 30 to avoid the obstacle while the altitude is changed (S106). If there is no obstacle in front of the flight, the safety tripod is flown toward the target point (S107). In other words, the target point is set to about one hundred meters (100 m) behind the accident point at daytime and about two hundred meters (200 m) behind the accident point at nighttime.

At this time, whether an obstacle is present at the target point is checked through the second camera 50 or the camera 15 (S108). If there is an obstacle, the target point is reset so as to avoid the point (S109). The safety tripod lands at the target point (S110). Upon reaching the target point, the motor 410 of the standing guide 400 is operated, and the supporting bar 430 is unfolded and supported on the ground (S111). The light source 121 emits light from the tripod 100 to notify an accident to the vehicle traveling in the rear (S112).

Referring to FIG. 12, the return operation of the safety tripod according to an embodiment of the present invention may be as follows. When the vehicle accident and malfunction are settled, a return signal is inputted to the safety tripod according to the present invention through the antenna unit 80 (S201). The operation of the light source 121 is stopped. The supporting bar 430 of the standing guide 400 is folded by the operation of the motor 410 (S202). The safety tripod is taken off by the operation of the flight driving machine 200 (S203).

The flight driving machines 200 are operated to fly the safety tripod toward the vehicle (S204). The first camera 10 or the camera 15 checks whether there is an obstacle in front of the flight (S205). If there is an obstacle, the flight driving machines 200 are operated by the operation of the flight altitude measurer 60 and the control unit 30 to change the flight altitude and avoid the obstacle (S206). If there is no obstacle in front of flight, a return point (the safety tripod storage box of the vehicle) is recognized (S207). The safety tripod lands on the return point (S208). The safety tripod according to the present invention is accommodated in the safety storage box of the vehicle, and the safety tripod storage box is closed (S209).

The safety tripod according to the present invention is capable of flying and can be easily stored in a vehicle.

In addition, according to the present invention, the driver can be protected from the accident point by flying the safety tripod to move from the vehicle to the target point after the accident.

Further, according to the present invention, the safety tripod can be easily installed at the target point and can be easily retrieved to the storage box of a vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A safety tripod comprising:
a tripod;
a flight driving machine mounted on the tripod and configured to fly the tripod;
a landing base configured to seat the tripod on a surface when the tripod lands; and
a standing guide mounted on the tripod and configured to stand the tripod up,
wherein the flight driving machine comprises:
a drive motor mounted at each corner of the tripod;
a propeller connected to each of the drive motor, configured to be rotated by a power generated by the drive motor, and configured to fly the tripod;
a flight controller configured to control an operation of the drive motor;
a first camera configured to photograph a front of a flight direction of the safety tripod;
a second camera configured to photograph a lower part of the flight direction of the safety tripod;
a flight altitude measurer configured to measure a flight altitude of the safety tripod; and
a position measurer configured to measure a flying position of the safety tripod are mounted on the tripod,
wherein the flight controller is configured to receive the flight direction, the flight altitude, and the flying position measured by the first camera, the second camera, the flight altitude measurer, and the position measurer to control the operation of the drive motor.

2. The safety tripod of claim 1, wherein the tripod comprises:
a frame formed in a triangular shape; and
an accident indicator mounted on the frame and comprising a light source configured to visually notify of an accident.

3. The safety tripod of claim 2, wherein the light source comprises a light emitting diode (LED) lamp.

4. The safety tripod of claim 1, further comprising:
a fisheye lens configured to photograph a front and a lower part of a flight direction of the safety tripod;
a flight altitude measurer configured to measure a flight altitude of the safety tripod; and
a position measurer configured to measure a flight position of the safety tripod are mounted on the tripod,
wherein the flight controller is configured to receive the flight direction, the flight altitude, and the flight position measured by the fisheye lens, the flight altitude measurer, and the position measurer to control the operation of the drive motor.

5. The safety tripod of claim 1, wherein the landing base comprises:
a connector vertically mounted on the tripod; and
a seat fixed to the connector and disposed parallel to the tripod.

6. The safety tripod of claim 1, wherein the standing guide comprises:
a motor fixed to the tripod;
a motor shaft rotatably mounted to the motor; and
a supporting bar configured to be rotated by the motor shaft and supported on a surface to stand the tripod up.

* * * * *